US008723805B2

(12) United States Patent
Ikegawa

(10) Patent No.: US 8,723,805 B2
(45) Date of Patent: May 13, 2014

(54) INFORMATION INPUT DEVICE, INFORMATION INPUT METHOD, AND INFORMATION INPUT PROGRAM

(75) Inventor: Yoshiharu Ikegawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1598 days.

(21) Appl. No.: 11/352,013

(22) Filed: Feb. 10, 2006

(65) Prior Publication Data

US 2006/0181520 A1   Aug. 17, 2006

(30) Foreign Application Priority Data

Feb. 14, 2005   (JP) ................................. 2005-036861

(51) Int. Cl.
*G06F 3/041* (2006.01)

(52) U.S. Cl.
USPC .......................................... 345/173; 345/174

(58) Field of Classification Search
USPC ................................................. 345/168–179
See application file for complete search history.

(56) References Cited

U.S. PATENT DOCUMENTS

| 5,349,480 | A  | * | 9/1994  | Takao ........................... 360/74.1 |
| 6,196,893 | B1 | * | 3/2001  | Casola et al. .................. 446/297 |
| 7,020,270 | B1 | * | 3/2006  | Ghassabian .................... 379/368 |
| 7,205,978 | B2 | * | 4/2007  | Poupyrev et al. ............. 345/157 |
| 7,292,227 | B2 | * | 11/2007 | Fukumoto et al. ............ 345/173 |
| 2001/0015718 | A1 | * | 8/2001 | Hinckley et al. .............. 345/156 |
| 2002/0057263 | A1 | * | 5/2002 | Keely et al. ................... 345/179 |
| 2004/0078416 | A1 | * | 4/2004 | Kawasaki et al. ............. 708/672 |
| 2004/0201576 | A1 | * | 10/2004 | Shimada et al. .............. 345/173 |
| 2004/0239637 | A1 | * | 12/2004 | Williams et al. .............. 345/172 |
| 2005/0088417 | A1 | * | 4/2005 | Mulligan ....................... 345/173 |
| 2005/0104867 | A1 | * | 5/2005 | Westerman et al. .......... 345/173 |
| 2005/0129241 | A1 | * | 6/2005 | Hardy et al. ................... 380/270 |
| 2005/0156904 | A1 | * | 7/2005 | Katayose ....................... 345/173 |
| 2005/0190970 | A1 | * | 9/2005 | Griffin ........................... 382/209 |
| 2006/0022958 | A1 | * | 2/2006 | Shiga ............................. 345/173 |
| 2006/0146032 | A1 | * | 7/2006 | Kajimoto et al. ............. 345/173 |
| 2006/0152497 | A1 | * | 7/2006 | Rekimoto ...................... 345/173 |
| 2008/0065391 | A1 | * | 3/2008 | Omi ............................... 704/275 |

FOREIGN PATENT DOCUMENTS

| JP | 11-110107 A | 4/1999 |
| JP | 11-212726 A | 8/1999 |
| JP | 2000-003652 A | 1/2000 |
| JP | 2002-342035 A | 11/2002 |
| JP | 2004-054827 A | 2/2004 |
| JP | 2005-010118 A | 1/2005 |

* cited by examiner

*Primary Examiner* — Alexander Eisen
*Assistant Examiner* — Nelson Lam
(74) *Attorney, Agent, or Firm* — Rossi, Kimms & McDowell LLP

(57) ABSTRACT

An information input device which enable even a user incapable of seeing an operation panel to identify the respective locations of keys on the operation panel and functions assigned to the keys, thereby enhancing operability of the device. The information input device is provided with a touch panel for inputting coordinate information based on a location thereon touched by a user. A pressure sensor detects the location on the touch panel touched by the user. A CPU determines whether or not there is a key assigned to the location detected by the pressure sensor. When it is determined that there is a key assigned to the location, a vibration generator vibrates the touch panel in a vibration pattern associated with the key. Further, when it is determined that there is a key assigned to the location, a voice output section outputs a voice associated with the key.

16 Claims, 15 Drawing Sheets

INFORMATION INPUT DEVICE, INFORMATION INPUT METHOD, AND INFORMATION INPUT PROGRAM

BACKGROUND OF THE INVENTION

1. Field of the Invention

The present invention relates to an information input device provided with a touch panel and a voice guidance function, an information input method, and an information input program.

2. Description of the Related Art

Conventionally, a vehicle-mounted input device has been known as an input device provided with a touch panel and a voice guidance function (see Japanese Laid-Open Patent Publication (Kokai) No. 2000-3652). This vehicle-mounted input device is comprised of a touch panel display provided with a touch panel, a plurality of first switches provided on the touch panel, each for switching between conduction and non-conduction when touched with a contact pressure not lower than a first predetermined value, a second switch that is switched between conduction and non-conduction when touched with a contact pressure not lower than a second predetermined value larger than the first predetermined value, first voice guidance means for guiding the user operation by giving voice prompts on one of the first switches which has been touched with the contact pressure not lower than the first predetermined value, and second voice guidance means for guiding the user operation by giving voice prompts on the state of the device switched between ON and OFF states in accordance with switching of the second switch between conduction and non-conduction. According to this device, since voice guidance is performed when one of the first switches is touched with a contact pressure not lower than the first predetermined value, the user can perform the touch operation, i.e. operate the device by feel alone.

However, the above descried conventional input device suffers from the following problems:

When the user is visually handicapped, he/she cannot identify a location on the touch panel assigned to a key until voice prompts thereon are delivered, which makes it difficult for the user to use the input device. Particularly in the case of a device in which a display menu is frequently changed on a function-by-function basis, the user finds difficulty even in roughly memorizing the respective locations of keys, and hence it takes time to perform an input operation.

On the other hand, when the user is non-handicapped, the constant or frequent delivery of voice prompts might be annoying.

SUMMARY OF THE INVENTION

It is an object of the present invention to provide an information input device, an information input method, and an information input program, which enable even a user incapable of seeing an operation panel to identify the respective locations of keys on the operation panel and functions assigned to the keys, thereby enhancing operability of the device.

To attain the above object, according to a first aspect of the present invention, there is provided an information input device comprising a touch panel that inputs operation information based on a location thereon touched by a user, a location detector section that detects the location on the touch panel touched by the user, a determination section that determines whether or not there is a key assigned to the location detected by the location detector section, a vibrator section that is operable in a case where the determination section determines that there is a key assigned to the location, to vibrate the touch panel in a vibration pattern associated with the key, a voice output section that is operable in a case where the determination section determines that there is a key assigned to the location, to output a voice associated with the key, a key press-detecting section that detects whether or not the key is pressed, and a key input-accepting section that is operable in a case where a predetermined condition is satisfied after detecting that the key is pressed, to accept a key input.

With the arrangement of the first aspect of the present invention, it is determined whether or not there is a key assigned to a location on the touch panel, touched by a user, and if there is a key assigned to the location, the touch panel is vibrated in a vibration pattern associated with the key. Further, when it is determined that there is a key assigned to the location, a voice output associated with the key is produced, so that even a user incapable of seeing an operation panel can identify the respective locations of keys on the touch panel and functions assigned to the keys, which contributes to enhancement of the operability of the device.

Preferably, the information input device comprises a configuration section that configures as to whether or not the vibrator section should perform vibration and whether or not the voice output section should perform voice output.

Preferably, in a case where a key displayed on the touch panel has been kept touched over a predetermined time period, the voice output section outputs a voice associated with the key.

Preferably, in a case where a key displayed on the touch panel is touched and then the user's finger is removed from the key within a predetermined time period, the key input-accepting section accepts a key input, whereas in a case where the key is kept touched even after a lapse of the predetermined time period, the key input-accepting section cancels the key input.

Preferably, the information input device comprises a pressure detector section that is operable in a case where the user presses the touch panel, to detect a pressure value of the pressing, and in a case where the pressure detector section detects that the pressure value of the pressing has reached a predetermined value, the voice output section outputs the voice associated with the key.

More preferably, in a case where the pressure value of the pressing reaches a predetermined value within a predetermined time period after the touch panel using pressed, the key input-accepting section accepts the key input, whereas in a case where the predetermined time period elapses before the pressure value of the pressing reaches the predetermined value, the key input-accepting section cancels the key input.

Preferably, in a case where a same key displayed on the touch panel is touched twice in succession within a predetermined time period, the voice output section outputs a voice associated with the key.

Preferably, after execution of voice output by the voice output section, in a case where the key has been kept touched over a predetermined time period, the key input-accepting section accepts a key input, whereas in a case where another key is touched, the key input-accepting section cancels the key input.

Preferably, in a state where a key displayed on the touch panel is touched, in a case where the location detected by the location detector section shifts out of an area to which the key is assigned, the key input-accepting section refuses acceptance of the key input, whereas in a case where the user's finger is removed from the key within the area to which the key is assigned, the key input-accepting section accepts the key input.

Preferably, in a case where a predetermined operation is carried out in a state where a key displayed on the touch panel is touched, the voice output section outputs a voice associated with the key.

Preferably, in a case where a predetermined time period has elapsed after the touch panel was touched, the vibrator section changes the vibration pattern associated with the key.

Preferably, the touch panel includes a display section that displays screens associated with respective keys.

To attain the above object, according to a second aspect of the present invention, there is provided an information input method comprising a display step of displaying an operating screen including keys, a location detecting step of detecting a location on a touch panel touched by a user, a determination step of determining whether or not there is a key assigned to the location detected in the location detecting step, a vibration step of vibrating the touch panel, in a case where it is determined in the determination step that there is a key assigned to the location, in a vibration pattern associated with the key, a voice output step of outputting, in a case where it is determined in the determination step that there is a key assigned to the location, a voice associated with the key, a key press-detecting step of detecting whether or not the key is pressed, and a key input-accepting step of accepting a key input, in a case where a predetermined condition is satisfied after detecting that the key is pressed.

To attain the above object, according to a third aspect of the present invention, there is provided an information input program executed by a computer provided with a touch panel, comprising a location detecting module for detecting a location on the touch panel touched by a user, a determination module for determining whether or not there is a key assigned to the location detected by the location detecting module, a vibration module for vibrating the touch panel, in a case where it is determined by the determination module that there is a key assigned to the location, in a vibration pattern associated with the key, a voice output module for outputting, in a case where it is determined by the determination module that there is a key assigned to the location, a voice associated with the key, a key press-detecting module for detecting whether or not the key is pressed, and a key input-accepting module for accepting a key input, in a case where a predetermined condition is satisfied after detecting that the key is pressed.

The above and other objects, features, and advantages of the invention will become more apparent from the following detailed description taken in conjunction with the accompanying drawings.

BRIEF DESCRIPTION OF THE DRAWINGS

FIGS. 3A to 3C are diagrams showing examples of waveforms of drive signals to be input to a vibration generator so as to vibrate a touch panel, in which:

FIG. 3A shows the waveform of a drive signal which produces two pulses with a pulse width of 10 ms;

FIG. 3B shows the waveform of a sinusoidal AC drive signal; and

FIG. 3C shows the waveform of an AC drive signal;

DETAILED DESCRIPTION OF THE PREFERRED EMBODIMENTS

Figure 1:
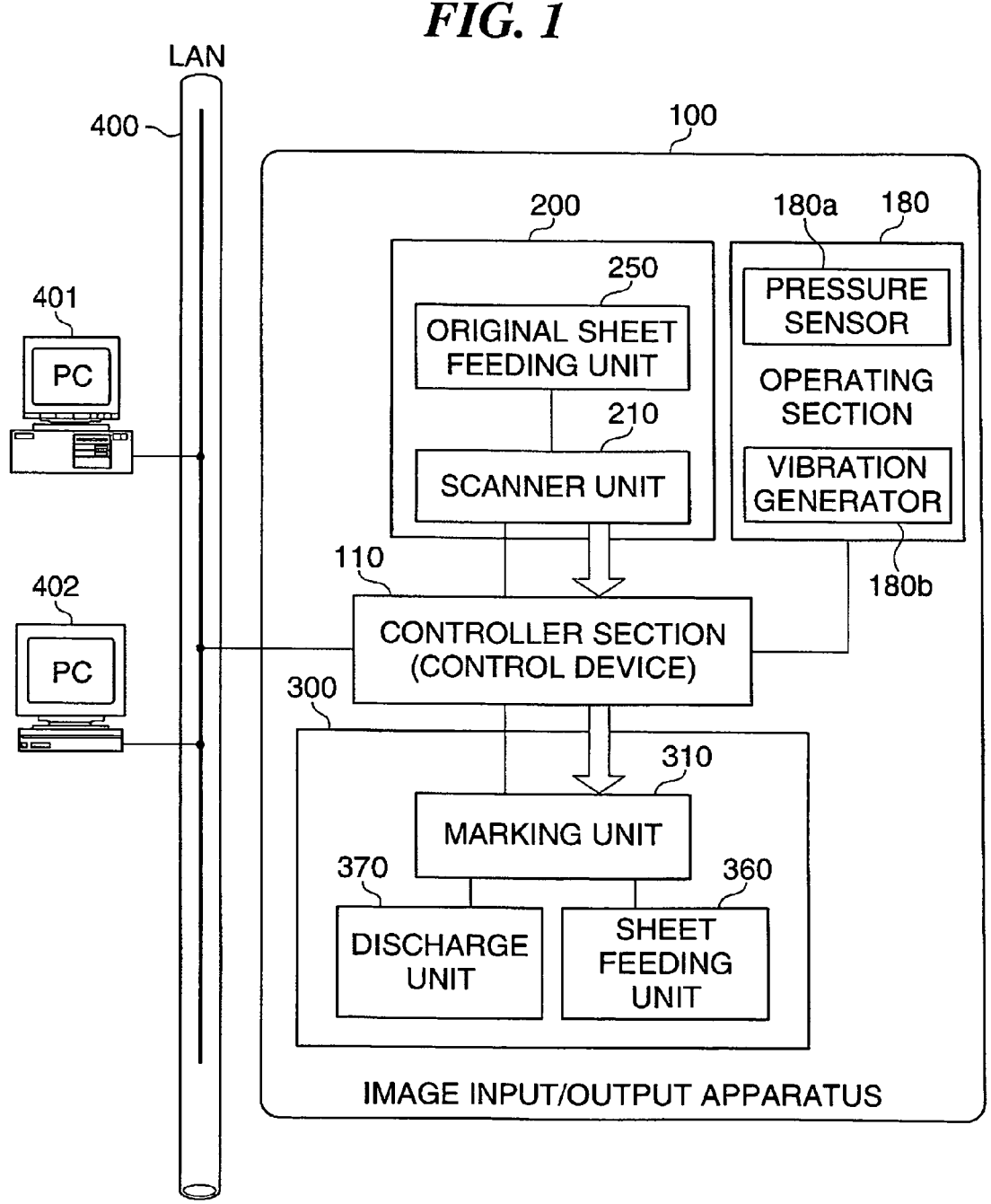
FIG. 1 is a block diagram showing the whole arrangement of an image input/output apparatus incorporating an information input device according to a first embodiment of the present invention.

The present invention will now be described in detail with reference to the drawings showing preferred embodiments thereof. In the drawings, elements and parts which are identical throughout the views are designated by identical reference numeral, and duplicate description thereof is omitted.

FIG. 1 is a block diagram showing the whole arrangement of an image input/output apparatus incorporating an information input device according to a first embodiment of the present invention.

The image input/output apparatus 100 is basically comprised of a reader section (image input device) 200, a printer section (printer device) 300, and a controller section (control device) 110.

The reader section 200 appearing in FIG. 1 optically reads an image of an original and converts the read data into image data. The reader section 200 is comprised of a scanner unit 210 having the function of reading originals, and an original sheet feeding unit 250 having the function of feeding original sheets.

The printer section 300 conveys recording sheets, prints image data as visible images on the recording sheets, and discharges the recording sheets from the apparatus. The printer section 300 is comprised of a sheet feeding unit 360 provided with a plurality of types of recording sheet cassettes, a marking unit 310 having the function of transferring and fixing image data onto each recording sheet, and a discharge unit 370 having the function of discharging printed recording sheets from the apparatus after sorting or stapling the printed recording sheets.

The controller section 110 is electrically connected to the reader section 200 and the printer section 300. Further, the controller section 110 is connected to host computers 401 and 402 via a network 400. The controller section 110 provides a copying function by controlling the reader section 200 to read image data from an original, and controlling the printer section 300 to output the image data onto a recording sheet.

Further, the controller section 110 provides a scanner function of converting image data read via the reader section 200 into code data and sending the code data to the host computer 401 or 402 via the network 400, and a printer function of converting code data received from the host computer 401 or 402 via the network 400 into image data and outputting the image data to the printer section 300.

An operating section 180 is connected to the controller section 110. The operating section 180 is implemented by a liquid crystal touch panel, and provides user interface (I/F) for operating the image input/output apparatus 100. Further, the operating section 180 is provided with a pressure sensor 180a for detecting pressure applied to the touch panel when a touch panel key displayed on the touch panel is pressed, and a vibration generator 180b for vibrating the touch panel.

Figure 2:
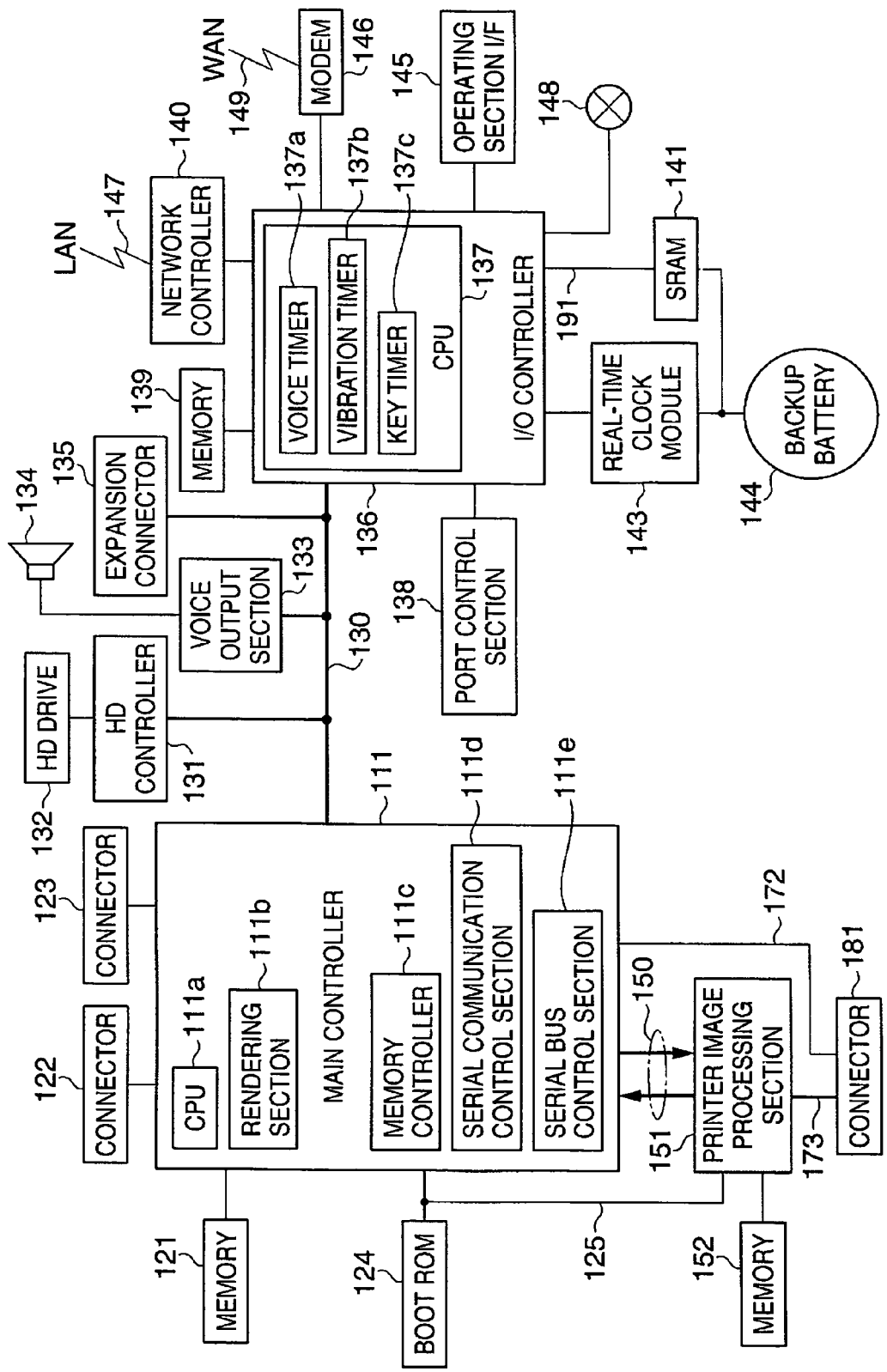
FIG. 2 is a block diagram showing the arrangement of a controller section.

FIG. 2 is a block diagram showing the arrangement of the controller section 110.

A main controller 111 includes a CPU 111a, a rendering section 111b, a memory controller 111c, a serial communication control section 111d, and a serial bus control section 111e.

The CPU 111a controls the overall operation of the controller section 110, and operates based on a program stored in a memory 121.

A process for interpreting PDL (page description language) code data received from the host computer 401 or 402 and converting the same into raster image data is also described in this program. The interpretation of the code data is performed by the CPU 111a, and the conversion of the code data into raster image data is performed by the rendering section 111b. The rendering section 111b generates raster image data based on the code data formed by the CPU 111a, and transfers the raster image data obtained by conversion of the code data to the memory 121 or a printer image processing section 151. The color space based on which image data is generated by the rendering section 111b include an RGB color space and a CMYK color space.

The serial communication control section 111d communicates with a CPU of the printer section 300 by exchanging control commands with the same via a serial bus.

The serial bus control section 111e performs communication with the host computers 401 and 402 and various other devices via a connector 122. The serial bus is generally implemented by an USB, which is used as an I/F for receiving PDL data from the host computers 401 and 402. A connector 123 is connected to the serial bus, for communication with the reader section 200 and transfer of image data. A boot ROM 124 stores a program which is started by the CPU 111a. The boot ROM 124 may store PDL font data if necessary.

An expansion connector 135 for connection of an expansion board, an I/O controller 136, a HD controller 131, and a voice output section 133 are connected to a general-purpose high-speed bus 130. The general-purpose high-speed bus 130 is generally implemented by a PCI bus. The HD controller 131 connects an external storage device to the general-purpose high-speed bus 130. In FIG. 2, a hard disk drive 132 is connected to the general-purpose high-speed bus 130 via the HD controller 131. The hard disk drive 132 is used for storing programs and image data.

The I/O controller 136 controls a data bus 191 for port control and interrupt control. Further, the I/O controller 136 incorporates a CPU 137, and controls a port control section 138, a network controller 140, an operating section I/F 145, and a modem 146. The CPU 137 includes a voice timer 137a, a vibration timer 137b, and a key timer 137c, referred to hereinafter.

The network controller 140 is connected to an external network 147. The external network 147 is generally implemented by Ethernet (registered trademark), and the network controller 140 is used for reception of PDL data from the host computers 401 and 402, transmission of scanner image, remote control, and so forth.

The modem 146 is connected to a public communication line 149, and performs facsimile communication. A memory 139 is a work memory for the CPU 137, and is used e.g. for processing image data to be displayed on the operating section 180.

The voice output section 133 is provided for outputting voice signals. The voice output section 133 outputs the voice signals to a speaker 134 based on data input via the general-purpose high-speed bus 130.

The operating section I/F 145 is comprised of an I/F used for display on the liquid crystal screen of the operating section 180, a key input I/F used for input via hard keys and touch panel keys, and an I/F used for outputting a signal to the vibration generator 180b so as to vibrate the touch panel, and an I/F used for inputting a signal indicative of pressure detected by the pressure sensor 180a.

Figure 3A:
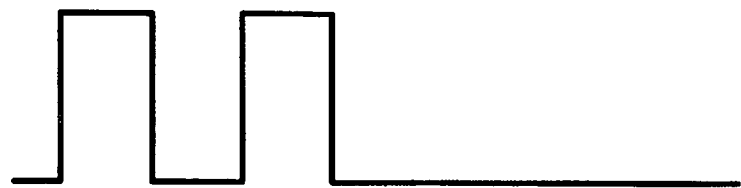
Figure 3B:
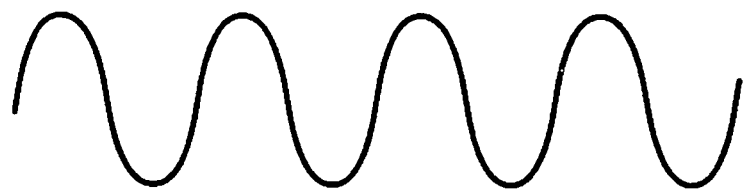
Figure 3C:

FIGS. 3A to 3C are diagrams showing respective examples of waveforms of drive signals to be input to the vibration generator 180b so as to vibrate the touch panel. FIG. 3A shows the waveform of a drive signal which produces two pulses with a pulse width of 10 ms. This drive signal causes the touch panel to vibrate twice instantaneously, whereby the user can obtain the same click feeling as obtained by pressing a push-button. FIG. 3B shows the waveform of a sinusoidal AC drive signal. This sinusoidal AC drive signal causes the touch panel to vibrate at the same frequency as that of the signal, whereby the user can obtain a feeling similar to that obtained from vibration caused by a motor. FIG. 3C shows the waveform of an AC drive signal. This AC drive signal causes the touch panel to vibrate at the same frequency as that of vibration caused by the drive signal in FIG. 3B. In this case, however, the AC drive signal is configured to be smaller in amplitude than the sinusoidal AC drive signal in FIG. 3B, and therefore the user is given a weaker feeling than that obtained by the sinusoidal AC drive signal in FIG. 3B.

It should be noted that the touch panel can be vibrated in various other vibration patterns, such as vibrations different in vibration interval and combinations of vibrations different in strength.

The operating section 180 is comprised of a liquid crystal display, a touch panel input device affixed to the liquid crystal display, and a plurality of hard keys.

A signal input via the touch panel or a hard key is transmitted to the CPU 137 as information on a hard key ID number input via the operating section I/F 145 in FIG. 2, and coordinate information of an input to the touch panel. The liquid crystal display displays image data sent from the operating section I/F 145. The liquid crystal display displays functions of the present image input/output apparatus selectable in operating the same, image data, and so forth.

A fan 148 is connected to the I/O controller 136, and is used to cool the whole controller section 110. A SRAM 141 is backed up by a backup battery 144, and stores user mode information and various other kinds of setup information, information on file management in the hard disk drive 132, and so forth.

A real-time clock module 143 updates and stores the date and time managed in the apparatus. The real-time clock module 143 is backed up by the backup battery 144.

The printer image processing section 151 is connected to the main controller 111 via a custom bus 125 and a high-speed bus 150. The high-speed bus 150 is connected between the main controller 111 and the printer image processing section 151 by one-way communication in a ring.

The printer image processing section 151 is connected to the printer section 300 via a connector 181, and has the function of carrying out predetermined image processing on image data input from the main controller 111 and outputting the processed image data to the main controller 111 or the printer section 300. A memory 152 is used as a work area and a delay buffer for the printer image processing section 151.

Figure 4:
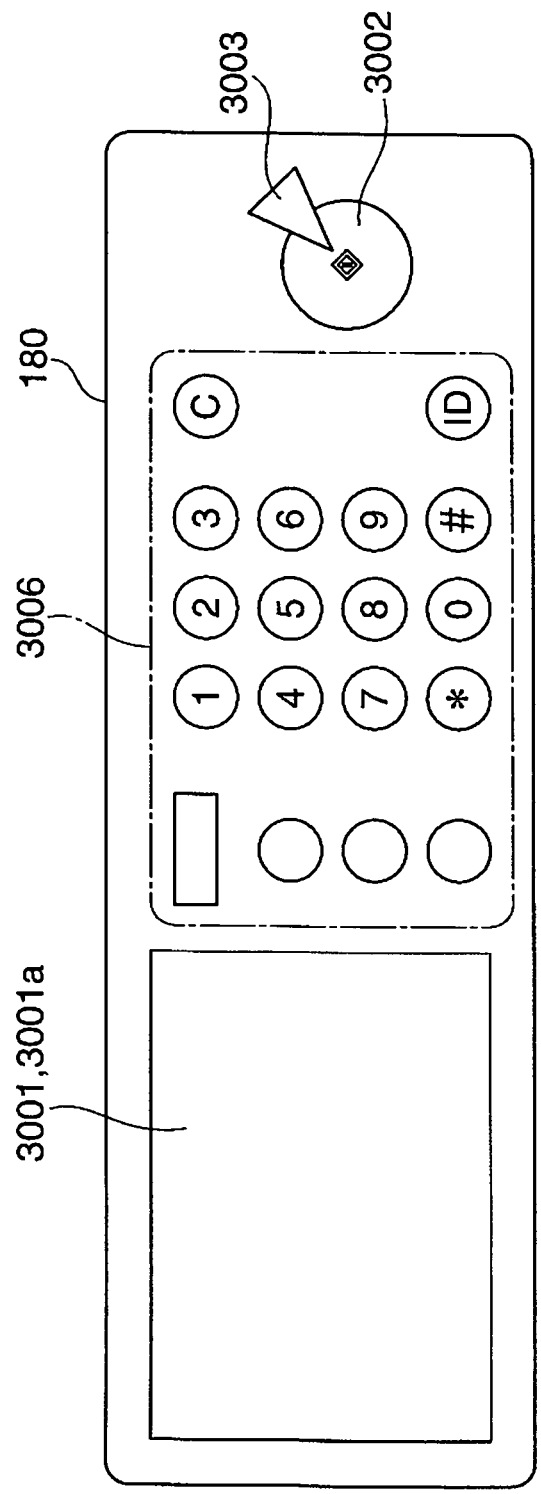
FIG. 4 is a view showing the arrangement of an operating section.

FIG. 4 is a view showing the arrangement of the operating section 180.

The operating section 180 is comprised of a touch panel 3001, a start key 3002, a stop key 3003, and a hard key group 3006.

The touch panel 3001 having a touch panel sheet 3001a laminated on the LCD thereof displays an operating screen of the apparatus, and when a key displayed on the operating screen is pressed, information on the location of the key (coordinate information) is sent to the CPU 137. The start key 3002 is used to start reading of an original or for the like operation. In the central part of the start key 3002, there are disposed red and green LEDs. When the green LED is on, it indicates that the start key 3002 is operable, while when the red LED is on, it indicates that the start key 3002 is inoperable.

The stop key 3003 has the function of stopping an operation under way. The hard key group 3006 includes ten keys, a clear key, a reset key, a guide key, a user mode key, and an ID key. The ID key is used to enter the user ID of a user. The reset key is used to initialize settings configured by inputs via the operating section 180.

The vibration generator 180b is capable of vibrating the whole touch panel sheet 3001a under the control of the controller section 110. When the operator touches the touch panel sheet 3001a, the touch panel sheet 3001a is vibrated by the vibration generator 180b, to transmit the vibration to a finger of the operator to thereby notify the operator that input operation is being carried out.

Figure 5:
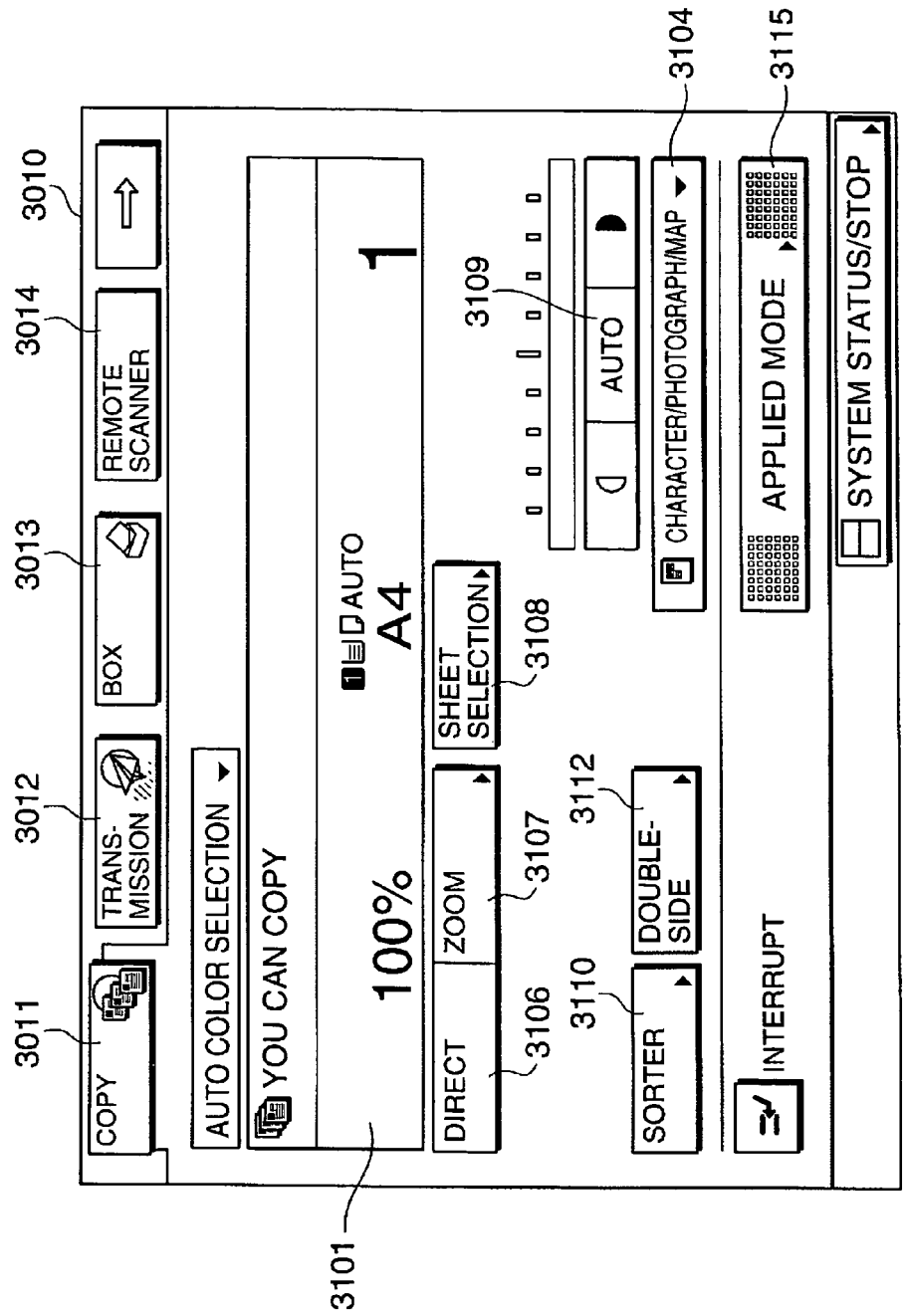
FIG. 5 is a view showing an example of an operating screen displayed when a copying function is selected on a touch panel.

FIG. 5 is a view showing an example of an operating screen displayed when the copying function is selected on the touch panel 3001.

Functions provided by the image input/output apparatus 100 shown in FIG. 1 are classified into four major categories: the copying function, the transmission/facsimile function, the box function, and the remote scanning function. These categories correspond to the respective four main tabs (a copying tab 3011, a transmission/facsimile tab 3012, a box tab 3013, and a remote scanning tab 3014) displayed in the uppermost part of the operating screen shown in FIG. 5. When one of the main tabs is pressed, the screen is switched to an operating screen for a category associated with the pressed main tab.

The copying function is to perform general document copying using the reader section 200 and the printer section 300 of the apparatus 100. The transmission/facsimile function is to read an original placed on the reader section 200 of the apparatus 100 and send the read original as image data by e-mail or facsimile transmission or file transfer, or to transfer the image data to a box or a database for storage. This function allows designation of a plurality of destinations.

The box function is to store image data of an original read by the reader section 200, image data received by facsimile transmission, and the PDL developed document data in the hard disk drive 132 provided in the apparatus 100. The image data and document data stored in the hard disk drive 132 can be printed or transmitted. The remote scanning function is to carry out pull scanning online.

Buttons (soft keys) displayed on the operating screen and the keys of the hard key group 3006 are assigned respective unique key IDs, and when a key input is received from one of the buttons and the keys, processing for screen switching or configuration or the like is carried out based on key ID information corresponding to the key input. Further, vibration setting information and voice output information are assigned to each key ID. This makes it possible to assign different vibration patterns and voice information to each key, thereby enabling the user to recognize the function of a key currently touched by the user through a vibration and a voice. Further, it is possible to configure settings of each key as to whether to cause vibration of the touch panel and whether to cause output of voice information. The vibration of the touch panel and the output of voice information can be switched on and off based on the configuration of the settings of each key.

In the following, a method of configuring the copying function will be described using the operating screen illustrated in FIG. 5 by way of example.

Figure 6:
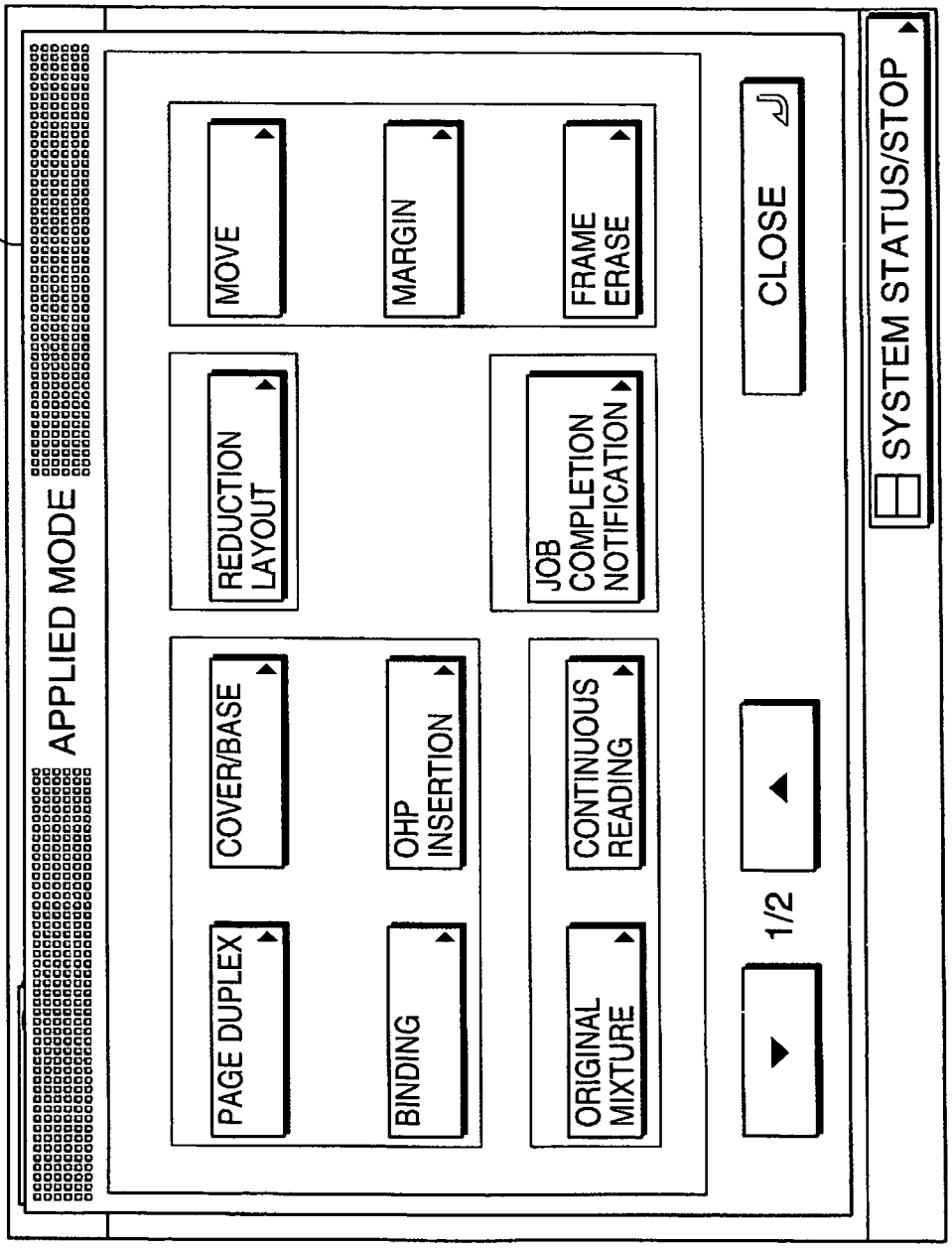
FIG. 6 is a view showing an example of an operating screen displayed when an applied mode-setting button is selected.

First, when the start button 3002 appearing in FIG. 4 is pressed when the operating screen in FIG. 5 is displayed, the reader section 200 starts operation, and a copy is output from the printer section 300, based on set parameters displayed on the operating screen. A main copy screen 3100 is comprised of an image quality-setting button 3104, a copy parameter display 3101, an equimagnification (direct) button 3106, a zoom button 3107, a sheet selection button 3108, a sorter setting button 3110, a double-sided copy-setting button 3112, a density indicator and density-setting button 3109, and an applied mode-setting button 3115. When the image quality-setting button 3104 is pressed, an image quality list is displayed to enable a desired image quality to be selected therefrom. When one of the copy parameter-setting buttons 3106 to 3115 is pressed, a subscreen for configuring settings corresponding to the key (i.e. a magnification/reduction setting screen, a sheet selection screen, a sorter setting screen, or a double-sided copy-setting screen) is displayed to enable parameters to be set. Further, the density setting button 3109 can be used for density setting. When the applied mode-setting button 3115 is selected, function setting buttons including a duplex-to-duplex copy button and a reduction layout button are displayed as shown in FIG. 6. When one of the function setting buttons is selected, a subscreen, not shown, corresponding to the selected button is displayed to enable parameters to be set.

Next, a method of configuring the transmission/facsimile function will be described using an operating screen illustrated in FIG. 7 by way of example.

Figure 7:
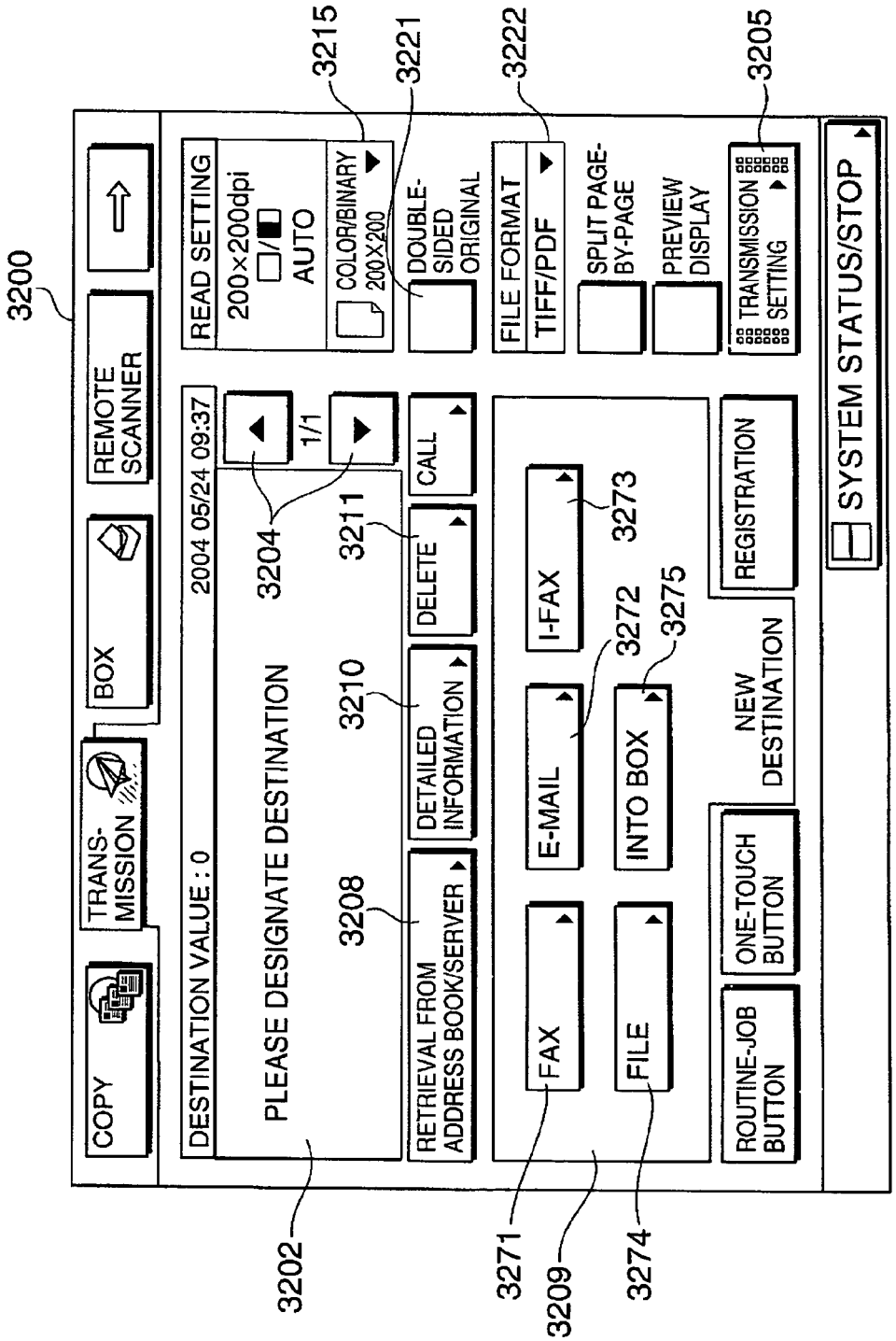
FIG. 7 is a view showing an example of an operating screen displayed when a transmission/facsimile tab is selected.

When the start button 3002 appearing in FIG. 4 is pressed when the operating screen shown in FIG. 7 is displayed, the reader section 200 operates to start a process for sending read image data to a designated destination by a specified transmission method.

The transmission/facsimile main screen 3200 is comprised of a destination display area 3202, destination scroll buttons 3204, an address book button 3208, transmission method selection buttons 3271 to 3275, an edit button 3210, a delete button 3211, a transmission setting button 3205, and a scan setting button 3215. As shown in the transmission/facsimile main screen 3200, at the time of initialization including resetting, no destination is displayed in the destination display area 3202, but a prompt screen is displayed.

A list of entered destinations is displayed in the destination display area 3202. Newly entered destinations are sequentially added to the end of the list. When a destination is selected from the destination display area 3202 and then the delete button 3211 is selected, the selected destination is deleted. When the transmission setting button 3205 is pressed, a screen for subject entry, message entry, and file name entry is displayed. When the address book button 3208 is selected, an address book subscreen is displayed to enable a destination address to be selected from registered destination addresses. When one of the transmission method selection buttons 3271 to 3275 corresponding to the respective transmission methods (e-mail transmission, facsimile transmission, I-FAX transmission, file transmission, box) is selected, a detail subscreen, not shown, is displayed so that a new destination can be set. When the scan setting button 3215 is selected, a scan setting subscreen, not shown, is displayed, and predetermined resolutions, scan modes and densities are displayed on the screen to enable selection therefrom. These values can be manually changed.

Next, a method of configuring the box function will be described using an operating screen illustrated in FIG. 8 by way of example.

Figure 8:
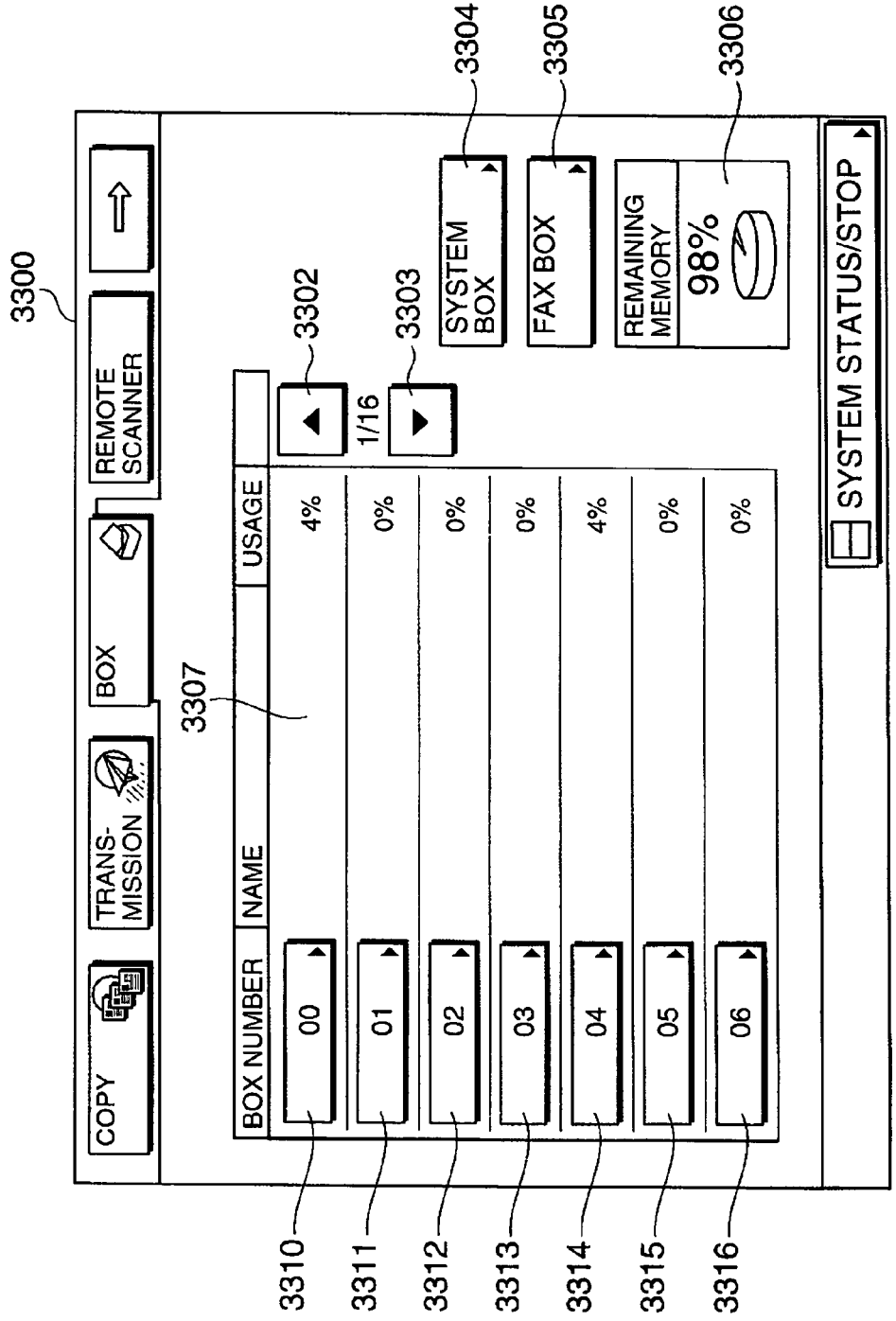
FIG. 8 is a view showing an example of an operating screen displayed when a box tab is selected.

The operating screen in FIG. 8 is used for storing image data read via the reader section 200 in a designated box, or for configuring settings for printing and transmission of documents stored in the box.

The box main screen 3300 is comprised of box selection buttons 3310 to 3316, box scroll buttons 3302 and 3303, a system box button 3304, a fax box button 3305, a remaining memory display area 3306, and box name display areas 3307. When one of the box selection buttons 3310 to 3316 is selected, a user box subscreen 3320 corresponding to the selected box selection button is displayed (see FIG. 9).

When the box scroll button 3302 or 3303 is selected, box numbers displayed on the box main screen 3300 are scrolled upward or downward. When the system box button 3304 is selected, a system box subscreen is displayed, and a list of documents received using the communication functions is displayed thereon. When the fax button 3305 is selected, a fax box subscreen is displayed. A fax box stores documents received by facsimile. When one of box selection buttons displayed on the fax box subscreen is pressed, a list of the documents stored in a box corresponding to the selected button is displayed. In the remaining memory display area 3306, there is displayed an available capacity of a document storage area secured in the hard disk drive 132. In the box name display areas 3307, there are displayed names set in association with the respective box numbers.

Figure 9:
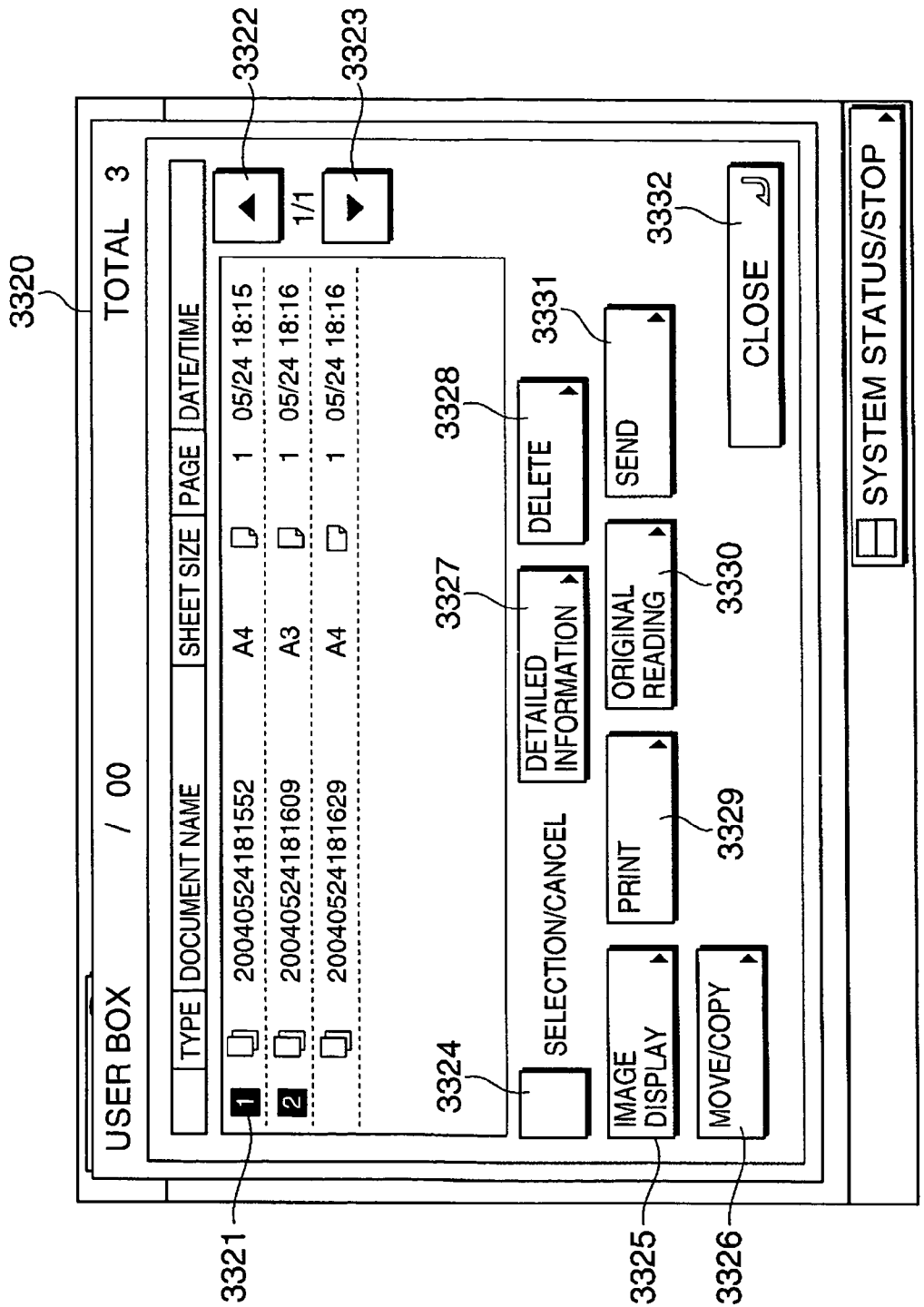
FIG. 9 is a view showing an example of an operating screen displayed when a box selection button is pressed in FIG. 8.

FIG. 9 is a view showing an example of the user box subscreen displayed when the box selection button 3310 is pressed on the screen in FIG. 8.

The user box subscreen 3320 is comprised of a box document display area 3321, display scroll buttons 3322 and 3323, a selection/cancel button 3324, an image display button 3325, a move/copy button 3326, a detail display button 3327, a delete button 3328, a print button 3329, an original reading button 3330, a send button 3331, and a close button 3332.

In the box document display area 3321, there is displayed a list of documents stored in the hard disk drive 132. When a document is selected from the list, a check mark is displayed for the document in the left-side end part of the box document display area 3321. When the display scroll button 3322 or 3323 is selected, displayed documents are scrolled upward or downward. The selection/cancel button 3324 performs the function of selecting all when no document has been selected, and the function of canceling selection when any document has been selected. When the image display button 3325 is selected, the currently selected document is displayed on the screen. When the move/copy button 3326 is selected, a subscreen is displayed to enable the selected document to be moved or copied to another box.

When the detail display button 3327 is selected, details of the settings of the currently selected document are displayed. When the delete button 3328 is selected, the currently selected document is deleted from the box. When the print button 3329 is selected, a print subscreen, not shown, is displayed to enable the selected document to be printed. When the original reading button 3330 is selected, an original reading subscreen is displayed to enable an original to be read by the scanner and stored in the box. When the send button 3331 is selected, a transmission subscreen, not shown, is displayed to enable the selected document to be sent to a designated destination. When the close button 3332 is selected, the screen returns to the box main screen 3300.

Figure 10:
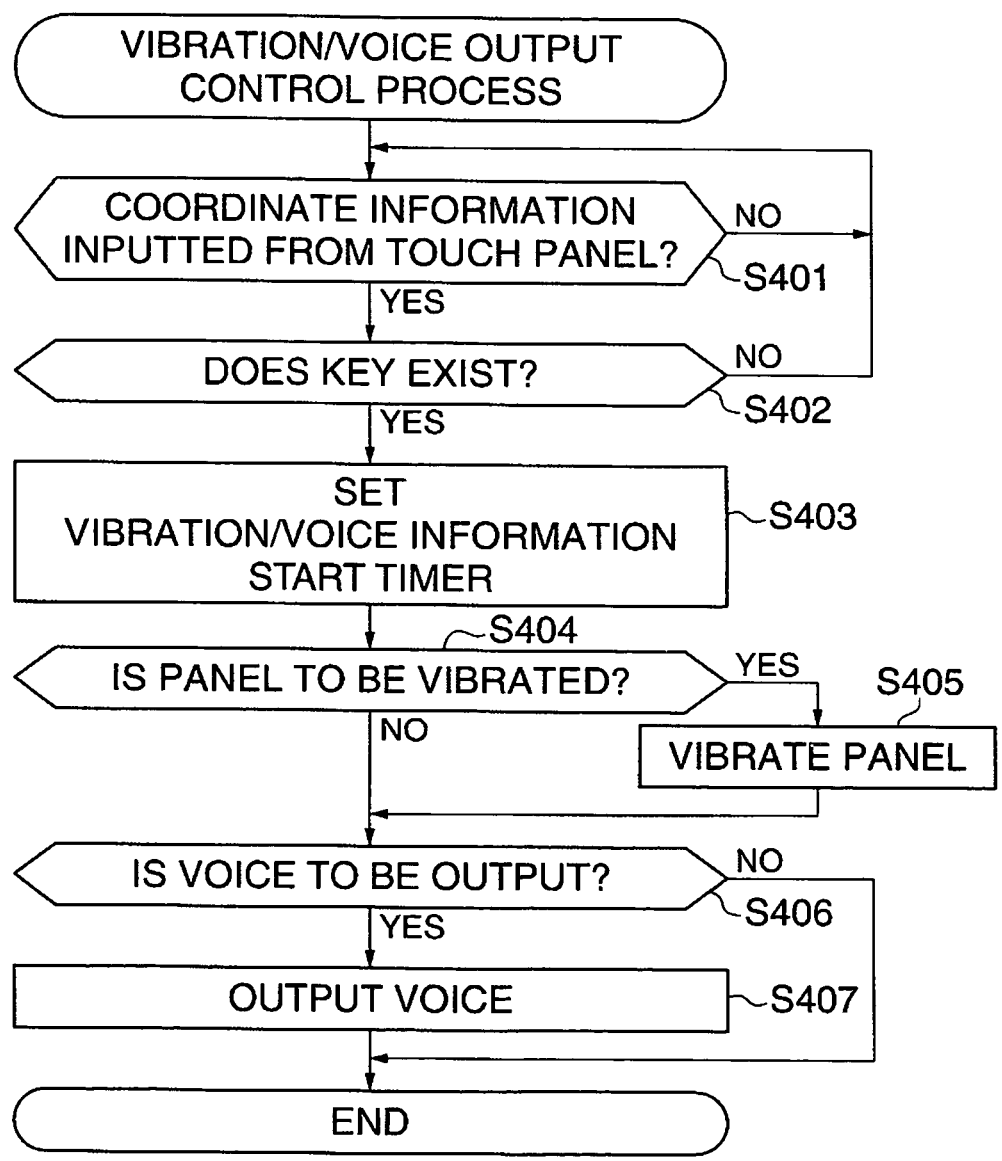
FIG. 10 is a flowchart showing a process for controlling vibration of the touch panel and voice output.

FIG. 10 is a flowchart showing a process for controlling vibration of the touch panel 3001 and voice output. The present process is mainly executed by the CPU 137.

First, it is determined whether or not a coordinate information input via the touch panel 3001 has been made from the operating section 180 (step S401). If no coordinate information input via the touch panel 3001 has been made, the step is repeatedly executed, and then if a coordinate information input via the touch panel 3001 has been made, the key ID of a button (soft key) on the screen is retrieved based on the coordinate information input via the touch panel 3001, to thereby determine whether or not there is a key at a coordinate position corresponding to the coordinate information on the touch panel 3001 (step S402).

If there is no key at the coordinate position on the touch panel 3001, the process returns to the step S401, whereas if there is a key at the coordinate position on the touch panel 3001, a touch panel vibration pattern and voice information associated with the key ID are set in the memory 139 (step S403).

Then, it is determined from the vibration pattern setting carried out in the step S403 whether or not the touch panel 3001 has been set to be vibrated (step S404). If the touch panel 3001 has been set to be vibrated, a vibration output pattern for vibration of the touch panel 3001 is set in the I/O controller 136 based on the vibration pattern set in the step S403, thereby vibrating the touch panel 3001 (step S405). On the other hand, if it is determined in the step S404 that the touch panel 3001 has been set not to be vibrated, it is determined from the voice information setting carried out in the step S403 whether or not voice output is to be carried out (step S406). If the voice output is not to be carried out, the present process is terminated. On the other hand, if voice output is to be carried out, the voice output section 133 is controlled based on the voice information set in the step S403, whereby the voice is output from the speaker 134 (step S407), followed by terminating the process.

When the above described process is executed, if the applied mode-setting button 3115 in FIG. 5 is pressed, the touch panel 3001 is vibrated in a vibration pattern associated with the applied mode-setting button 3115, and a voice message "The screen will be switched to the applied mode screen." is output from the speaker 134. Alternatively, if the double-sided copy-setting button 3112 is pressed, the touch panel 3001 is vibrated in a vibration pattern associated with the double-sided copy-setting button 3112, and a voice message "Setting for double-sided copying will be performed." is output from the speaker 134. Further, if one of the box selection buttons 3310 to 3316 in FIG. 8 is pressed, the touch panel 3001 is vibrated in a vibration pattern associated with the box selection button, and voice output of the selected box number is performed. When a name is assigned to the box, voice output of the name is also performed. Furthermore, if the box document display area 3321 is selected on the user box subscreen in FIG. 9, the touch panel 3001 is vibrated in a vibration pattern associated with the box document display area 3321, and voice output of the details of a designated document and whether or not the document has been checked is performed. For example, the details of the document subjected to the voice output include a document name, a sheet size, and the number of pages. Of course, it is also possible to cause either only vibration or only voice output to be performed, depending on settings as to whether to cause vibration and whether to cause voice output.

Figure 11:
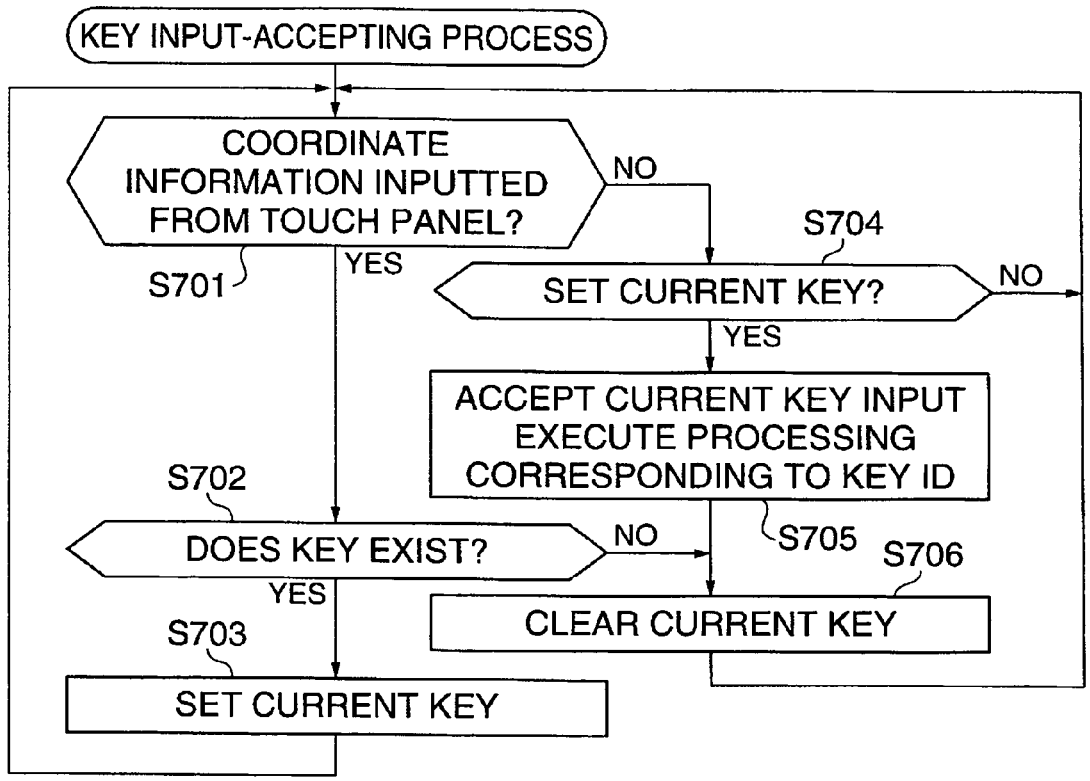
FIG. 11 is a flowchart showing a process for accepting a key input from the touch panel.

FIG. 11 is a flowchart showing a process for accepting a key input from the touch panel 3001. The present process is mainly executed by the CPU 137.

First, it is determined whether or not a coordinate information input via the touch panel 3001 has been made from the operating section 180 (step S701). If a coordinate information input has been made from the touch panel 3001, the key ID of a button (soft key) on the screen is retrieved based on the coordinate information input from the touch panel 3001, to thereby determine whether or not there is a key at the coordinate position corresponding to the coordinate information on the touch panel 3001 (step S702). If it is determined in the step S702 that there is a key at the coordinate position on the touch panel 3001, the retrieved key ID is set to the "current key" (step S703), and the process returns to the step S701, to repeatedly process an input from the touch panel 3001, if any.

If it is determined in the step S702 that there is no key at the coordinate position on the touch panel 3001, the key ID set to the "current key" is cleared (step S706).

When the operator's finger is removed from the touch panel 3001 and the input of coordinate information from the touch panel 3001 ceases, it is determined whether or not the information of the key ID set to the "current key" is valid (step S704). If it is determined in the step S704 that the information of the key ID is valid, the input of the key ID is accepted, and processing corresponding to the key ID is carried out (step S705). After acceptance of the key ID, the key ID set to the "current key" is cleared (step S706), and the process returns to the step S701, to process an input from the touch panel 3001, if any, again. If it is determined in the step S704 that the information of the key ID set to the "current key" is not valid, the process returns to the step S701, to repeatedly process an input from the touch panel 3001, if any.

In the above described process, when the coordinate position corresponding to coordinate information from the touch panel 3001 moves from an area assigned to the detected key with the touch panel 3001 being pressed, the key input is cancelled (YES to the step S701→NO to the step S702→the step S706), whereas when the operator's finger is removed from the area assigned to the detected key (i.e. when the coordinate position corresponding to the coordinate information from the touch panel 3001 remains within the area assigned to the detected key), the key input is accepted (YES to the step S701→YES to the step S702→the step S703→No to the step S701→Yes to the step S704→the step S705).

As described in detail above, according to the present embodiment, when a key is assigned to a coordinate position on the touch panel 3001, touched by the user, the vibration of the touch panel 3001 in a vibration pattern associated with the key and/or the voice output corresponding to the key are performed. This enables the respective locations of the buttons on the operating section to be identified and the functions assigned to the respective buttons on the operating panel to be confirmed without a view of the operating panel, which contributes to improvement of the operability of the device.

Further, when the user's finger is removed from the touch panel 3001 at a location where a button exists, the key input is accepted, whereas when the user's finger is removed from the touch panel 3001 at a location where no button exists, i.e. when the user's finger is slid to a position where vibration and voice output are not carried out, and then removed from the touch panel 3001, the key input is canceled, which makes it possible to prevent acceptance of a key input caused by an erroneous touch on a button.

Next, a second embodiment of the present invention will be described with reference to FIGS. 12 and 13.

The second embodiment of the present invention is distinguished from the first embodiment in the process for controlling vibration of the touch panel 3001 and voice output and the process for accepting a key input from the touch panel 3001. Component elements identical to those of the first embodiment are designated by identical reference numerals, and description thereof is omitted.

Figure 12:
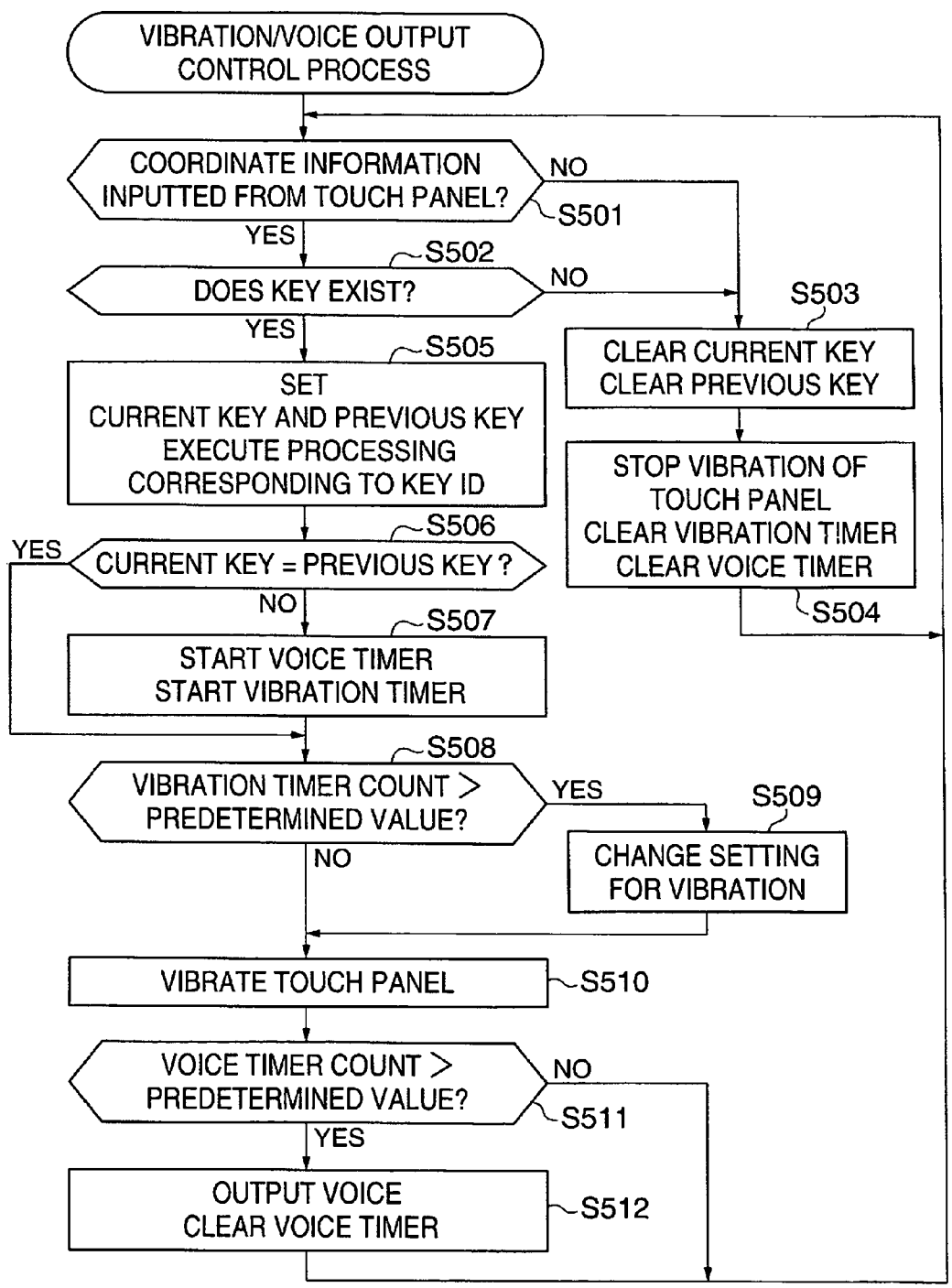
FIG. 12 is a flowchart showing a process for controlling vibration of a touch panel and voice output, according to a second embodiment of the present invention.

FIG. 12 is a flowchart showing the process for controlling vibration of the touch panel 300i and voice output. The present process is mainly executed by the CPU 137.

First, it is determined whether or not a coordinate information input via the touch panel 3001 has been made from the operating section 180 (step S501). If a coordinate information input has been made from the touch panel 3001, the key ID of a button (soft key) on the screen is retrieved based on the coordinate information input from the touch panel 3001, to thereby determine whether or not there is a key at the coordinate position corresponding to the coordinate information on the touch panel 3001 (step S502).

Each key ID is associated with voice information, first vibration information to be set when the key is touched, and second vibration information to be set after the lapse of a predetermined time period.

If it is determined in the step S502 that there is a key at the coordinate position corresponding to the coordinate information on the touch panel 3001, a key ID currently set to the "current key" is set to the "previous key", and the retrieved key ID is set to the "current key" (step S505). A "previous key" is used to determine whether or not a key on the touch panel 3001 has been kept pressed over a predetermined time period (e.g. 10 seconds). Then, comparison between the key ID set to the "previous key" and the key ID set to the "current key" is performed (step S506). If the key on the touch panel 3001 has not been kept pressed over the predetermined time period, i.e. if the key ID set to the "previous key" and the key ID set to the "current key" are different from each other, the process proceeds to a step S507, whereas if the two key IDs are identical, i.e. if the key ID set to the "previous key" and the key ID set to the "current key" are the same, the process proceeds to a step S508.

In the step S507, first vibration information and voice information associated with the key ID set to the "current key" are set in the memory 139, and the voice timer 137a and the vibration timer 137b are initialized to start counting time.

In the step S508, it is determined whether or not the vibration timer 137b has counted up the predetermined time period (e.g. 10 seconds). If the vibration timer 137b has counted up the predetermined time period, the setting of the vibration is set to the second vibration information (step S509).

Then, the vibration output pattern for the touch panel 3001 is set in the I/O controller 136 based on the set vibration information to vibrate the touch panel 3001 (step S510).

Next, it is determined whether or not the voice timer 137a has counted up a predetermined time period (e.g. 20 seconds) (step S511). If the voice timer 137a has counted up the predetermined time period, the voice output section 133 is controlled based on the voice information set in the step S507, to output a voice from the speaker 134 (step S512), and the process returns to the step S501.

If it is determined in the step S501 that no coordinate information has been input from the touch panel 3001 or if it is determined in the step S502 that there is no key at the coordinate position, the key IDs set to the "current key" and the "previous key" are cleared (step S503), and the vibration of the touch panel 3001 is stopped. Then, the vibration timer 137b and the voice timer 137a are initialized (step S504), followed by the process returning to the step S501.

Although in the above described process, when a predetermined time period has elapsed with one key kept pressed, vibration is switched to voice output, but this is not limitative, but voice output may be started when one key is pressed again before a very short predetermined time period (e.g. 3 seconds) has elapsed after the start of vibration caused by first-time press of the key.

Figure 13:
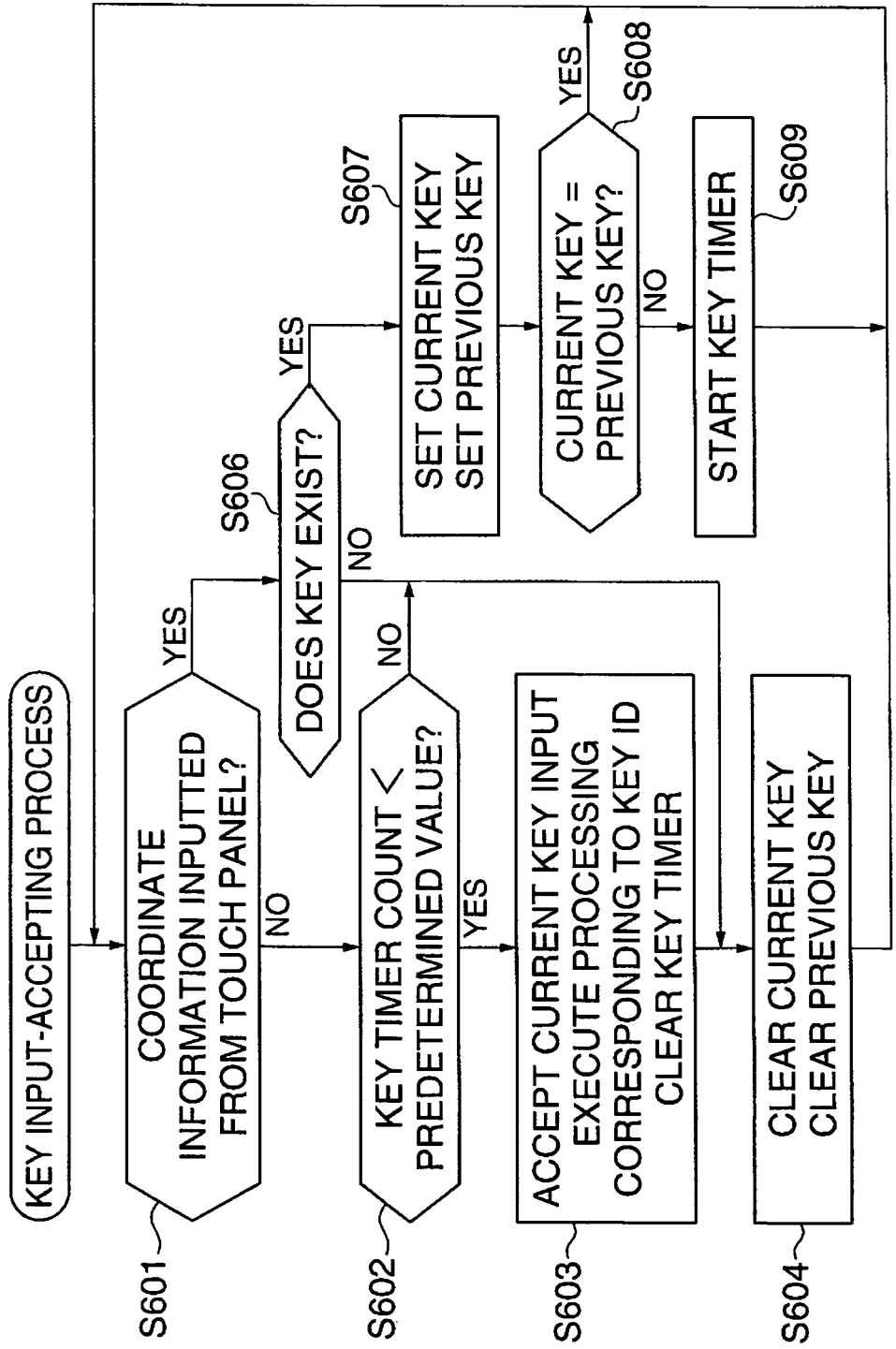
FIG. 13 is a flowchart showing a process for accepting a key input from the touch panel.

FIG. 13 is a flowchart showing the process for accepting a key input from the touch panel 3001. The present process is mainly executed by the CPU 137.

First, it is determined whether or not a coordinate information input via the touch panel 3001 has been made from the operating section 180 (step S601). If a coordinate information input has been made from the touch panel 3001, the key ID of a button (soft key) on the screen is retrieved based on the coordinate information input from the touch panel 3001, to thereby determine whether or not there is a key at the coordinate position corresponding to the coordinate information on the touch panel 3001 (step S606).

If it is determined that there is a key at the coordinate position on the touch panel 3001, a key ID currently set to the "current key" is set to the "previous key", and the retrieved key ID is set to the "current key" (step S607). The "previous key" is used to determine whether or not a key on the touch panel 3001 has been kept pressed over a predetermined time period (e.g. 10 seconds). Then, comparison between the key ID set to the "previous key" and the key ID set to the "current key" is performed (step S608). If the key on the touch panel 3001 has not been kept pressed over the predetermined time period, i.e. if the key ID set to the "previous key" and the key ID set to the "current key" are different from each other, the process proceeds to a step S609, whereas if the two key IDs are identical, i.e. if the key ID set to the "previous key" and the key ID set to the "current key" are the same, the process returns to the step S601. In the step S609, the key timer 137c is initialized to start counting time, and then the process returns to the step S601.

If no coordinate information has been input from the touch panel 3001 in the step S601, it is determined whether or not the key timer 137c has counted up the predetermined time period (step S602). If the key timer 137c has not counted up the predetermined time period, the key timer 137c is stopped and initialized, whereafter the key ID set to the "current key" is accepted as an input, and processing associated with the key ID is executed (step S603). Then, the key IDs set to the "current key" and the "previous key" are cleared (step S604), and the process returns to the step S601.

If it is determined in the step S602 that the key timer 137c has counted up the predetermined time period, or if it is determined in the step S606 that there is no key at the coordinate position on the touch panel 3001, the process proceeds to the step S604, wherein the key IDs set to the "current key" and the and "previous key" are cleared.

As described in detail above, according to the present embodiment, it is possible to provide the same advantageous effects as provided by the first embodiment.

Further, when a key displayed on the touch panel 3001 has been kept touched over a predetermined time period, a voice associated with the key is output (steps S511 and S512), and hence by outputting a voice when a predetermined time period has elapsed after operating a button or when the same button is operated twice in succession after first-time operation of the same, it is possible to avoid giving useless guidance.

Further, when the user's finger is removed from a key on the touch panel 3001 before a predetermined time period has elapsed after pressing of the key, the key input is accepted, whereas when the key has been kept touched over the predetermined time period, the key input is cancelled (steps S602 to S604), so that it is possible not only to maintain the same operability as in the prior art by quick operation but also to achieve output of voice guidance by slow operation.

Figure 14:
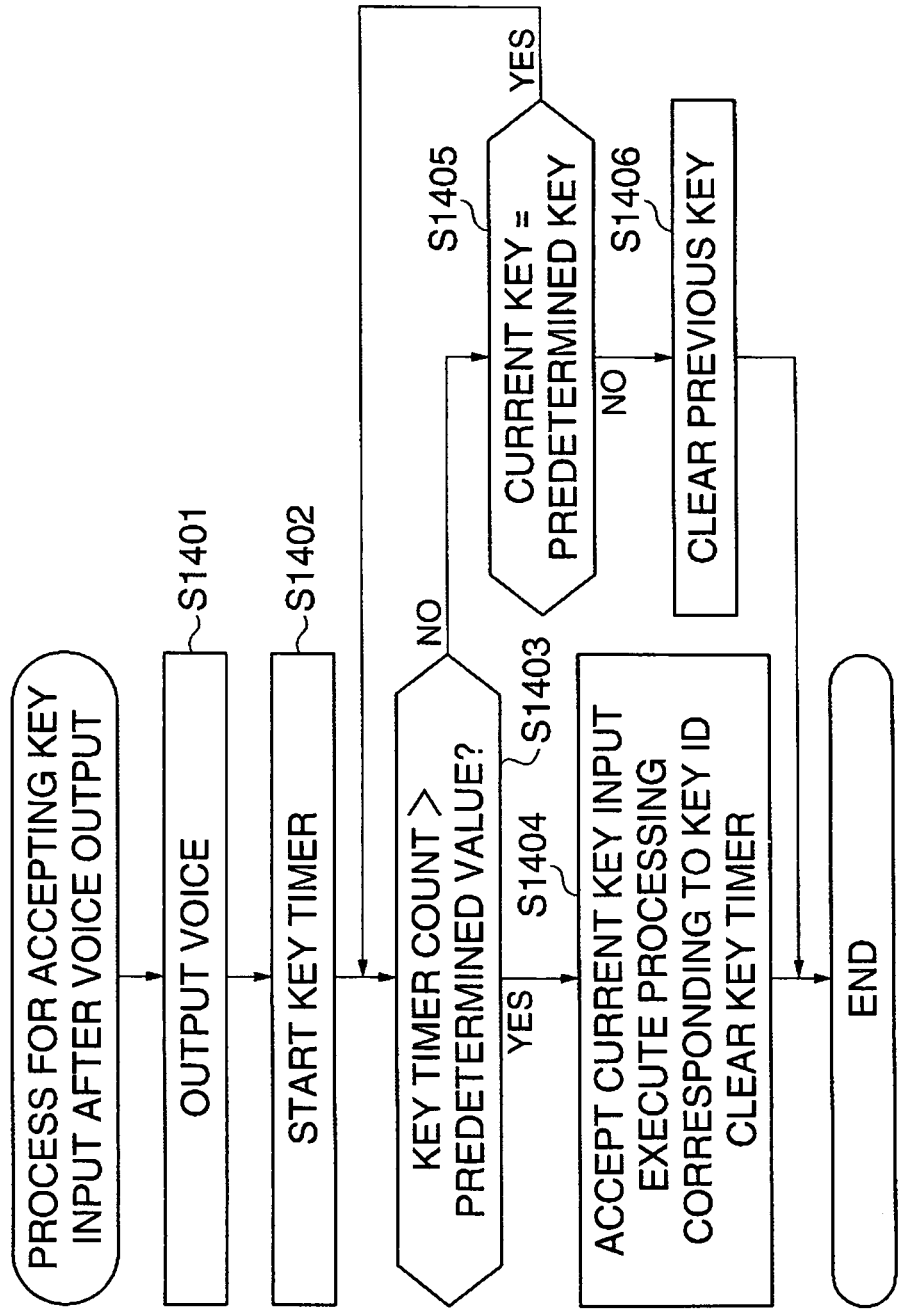
FIG. 14 is a flowchart showing a process for accepting a key input from the touch panel after voice output.

Further, as shown in FIG. 14, the information input device may be configured such that when a button has been kept touched over a predetermined time period after voice output, the key input is accepted, whereas when another key is touched before the predetermined time period has elapsed, the input by the previously touched key is canceled.

FIG. 14 is a flowchart showing a process for accepting a key input after voice output. The present process is mainly executed by the CPU 137.

First, when voice output is performed (step S1401), the key timer 137c is initialized to start counting time (step S1402).

Next, it is determined whether or not the key timer 137c has counted up a predetermined time period (step S1403). If it is determined in the step S1403 that the key timer 137c has counted up the predetermined time period, the key timer 137c is stopped and initialized, and a key ID set to the "current key" is accepted as an input to execute processing associated with the key ID (step S1404), followed by terminating the present process. On the other hand, if it is determined in the step S1403 that the key timer has not counted up the predetermined time period, comparison between the key ID set to the "previous key" and the key ID set to the "current key" is performed (step S1405). If the key ID set to the "previous key" and the key ID set to the "current key" are different from each other, the key ID set to the "previous key" is cleared (more specifically, when another key is touched, the immediately preceding key input is canceled) (step S1406). On the other hand, if the key ID set to the "previous key" and the key ID set to the "current key" are the same, the process returns to the step S1403.

Further, in the present embodiment, when a predetermined time period has elapsed after the touch panel 3001 was touched, the vibration pattern of the touch panel is changed (step S509), which makes it possible to notify the operator that the key input has been cancelled.

Although in FIG. 12, voice output is performed in succession to vibration when a predetermined time period has elapsed after a key operation or when the same key is operated twice in succession, this is not limitative, but voice output may be performed in succession to vibration based on a change in pressure applied to the touch panel by a key input operation.

More specifically, the information input device may be configured such that when it is detected that a pressing force by the key input operation has reached a first pressure value, the touch panel is vibrated, and further, when it is detected the pressing force has reached a second pressure value higher than the first pressure value, a voice is output.

Figure 15:
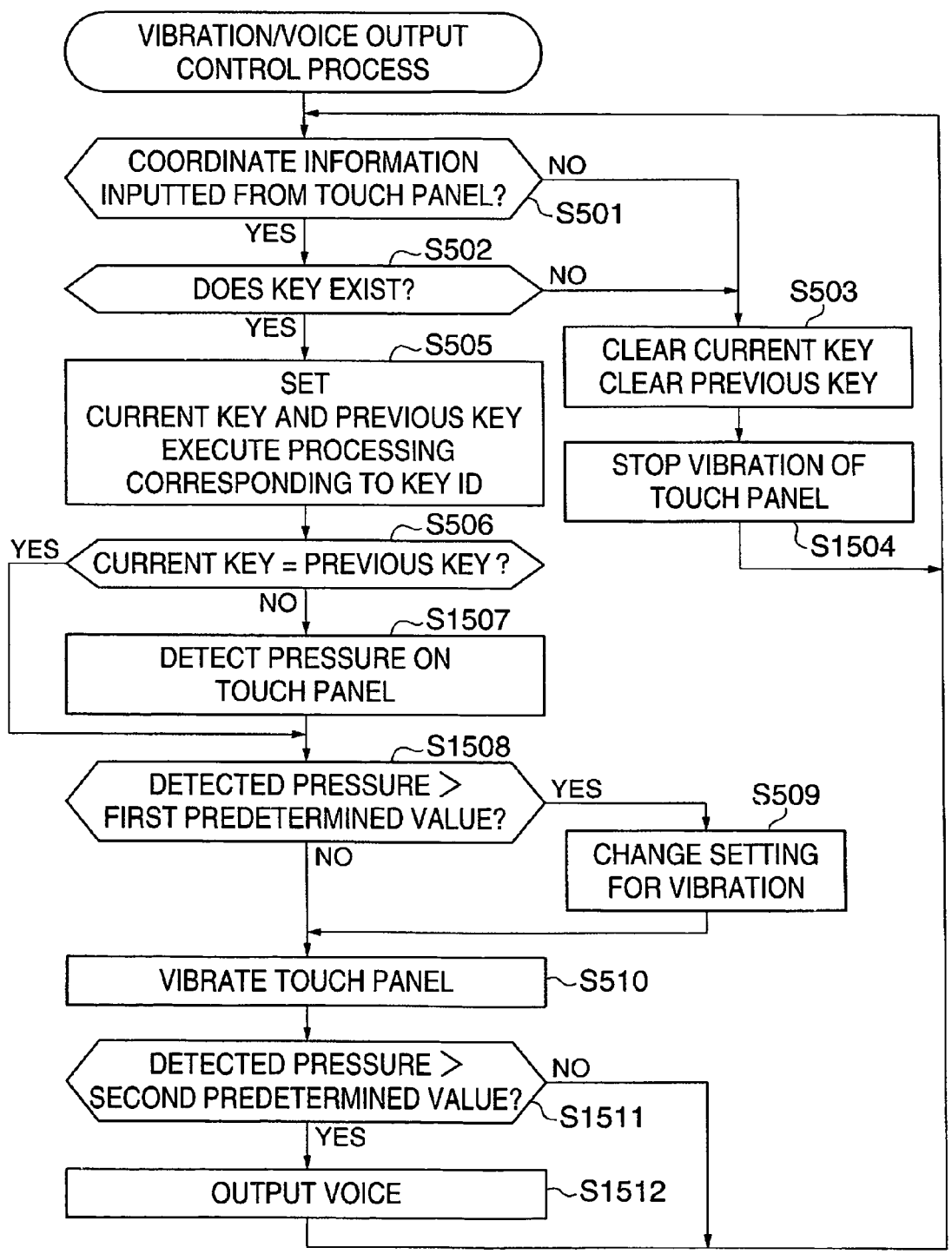
FIG. 15 is a flowchart showing a variation of the FIG. 12 process for controlling vibration of the touch panel and voice output.

FIG. 15 is a flowchart showing a variation of the process in FIG. 12 for controlling vibration of the touch panel 3001 and voice output. The present process is mainly executed by the CPU 137.

Steps similar to those in FIG. 12 are designated by identical step numbers, and description thereof is omitted.

After execution of the step S503, vibration of the touch panel 3001 is stopped (step S1504), and the process returns to the step S501.

If it is determined in the step S506 that the key ID set to the "previous key" and the key ID set to the "current key" are different from each other, pressure applied to the touch panel 3001 when the key is pressed is detected by the pressure sensor 180a (step S1507).

In a step S1508, it is determined whether or not the pressure detected by the pressure sensor 180a is larger than a first predetermined value (e.g. 200 g/cm$^2$). If the detected pressure is larger than the first predetermined value, the process proceeds to the step S509, whereas if the detected pressure is smaller than the first predetermined value, the process proceeds to the step S510.

After execution of the step S510, it is determined whether or not the pressure detected by the pressure sensor 180a is larger than a second predetermined value (e.g. 500 g/cm$^2$) (step S1511). If the detected pressure is smaller than the second predetermined value, the process returns to the step S501. On the other hand, if the detected pressure is larger than the second predetermined value, the voice output section 133 is controlled based on the associated voice information to output a voice from the speaker 134 (step S1512), and the process returns to the step S501.

Then, though not shown in FIG. 15, if the user's finger is removed from the key when a predetermined time period has elapsed after the pressing force applied to the touch panel having reached the second predetermined value for executing voice output (i.e. there is a key at a coordinate position on the touch panel 3001, touched by the user), the key input is accepted, whereas if the user's finger is slid out of the key area (i.e. if there is no key at the coordinate position on the touch panel 3001) or if the predetermined time has elapsed with pressure applied to the touch panel 3001 being held between the first predetermined value for causing vibration and the second predetermined value for executing voice output, the key input is cancelled.

Further, a key for giving an instruction for voice output may be provided e.g. as a fixed hard key on the operating section 180, whereby after touching a soft key on the touch panel, the hard key may be operated, with the soft key being kept touched, so as to cause a voice associated with the soft key to be outputted. Since the operation is performed using a fixed key, it is easy to operate the key. Further, the operating section 180 may be provided with a key for starting vibration, a key for determining acceptance of a key input, and a key for giving an instruction for cancellation.

Thus, operations, such as the starting of vibration, the starting of voice output, and the acceptance and cancellation of a key input, can be performed in various patterns.

Although in the above, the operating section of the multi-function machine provided with the copying function, the scanner function, the printer function, and the communication functions is described by way of example, this is not limitative, but the present invention can also be applied to devices each provided with only one of these functions, as well as to various kinds of apparatuses and systems, such as personal computers and car navigation systems, each of which is equipped with a touch panel function.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Patent Application No. 2005-036861, filed Feb. 14, 2005, which is hereby incorporated by reference herein its entirely.

What is claimed is:

1. An information input device comprising:
   a location detector section that detects a location on a touch panel touched by a user, a plurality of keys being located on an operating screen corresponding to the touch panel;
   a determination section that determines whether or not a key is assigned to the location detected by said location detector section;
   a vibrator section that is operable in a case where said determination section determines that the key is assigned to the location, to vibrate said touch panel in a vibration pattern associated with the key, the vibration pattern being different from a vibration pattern associated with another key among the plurality of keys;
   a voice output section that is operable in a case where said determination section determines that the key is assigned to the location, to output a voice associated with the key;
   a key press-detecting section that detects whether or not the key is pressed;
   a key input-accepting section that is operable in a case where a predetermined condition is satisfied after detecting that the key is pressed, to accept a key input; and
   a controller that controls said vibrator section to vibrate said touch panel when a key is touched, and controls said voice output section to output the voice when the key has been kept touched beyond a predetermined time period, while not outputting the voice when the key is not kept touched beyond the predetermined time period.

2. The information input device as claimed in claim 1, further comprising a configuration section that configures as to whether or not said vibrator section should perform vibration and whether or not said voice output section should perform voice output.

3. The information input device as claimed in claim 1, further comprising:
   a pressure detector section that is operable in a case where the user presses said touch panel, to detect a pressure value of the pressing,
   wherein in a case where said pressure detector section detects that the pressure value of the pressing has reached a predetermined pressure value, said voice output section outputs the voice associated with the key.

4. The information input device as claimed in claim 3, wherein in a case where the pressure value of the pressing reaches the predetermined pressure value within the predetermined time period after said touch panel using pressed, said key input-accepting section accepts the key input, whereas in a case where the predetermined time period elapses before the pressure value of the pressing reaches the predetermined pressure value, said key input-accepting section cancels the key input.

5. The information input device as claimed in claim 1, wherein in a case where a same key located on said touch panel is touched twice in succession within the predetermined time period, said voice output section outputs a voice associated with the key.

6. The information input device as claimed in claim 1, wherein in a case where a predetermined operation is carried out in a state where a key located on said touch panel is touched, said voice output section outputs a voice associated with the key.

7. The information input device as claimed in claim 1, wherein in a case where a predetermined time period has elapsed after said touch panel was touched, said vibrator section changes the vibration pattern associated with the key.

8. The information input device as claimed in claim 1, wherein said touch panel includes a display section that displays screens associated with respective keys.

9. An information input method comprising:
   a display step of displaying an operating screen including a plurality of keys;
   a location detecting step of detecting a location on a touch panel touched by a user, the operating screen corresponding to the touch panel;
   a determination step of determining whether or not a key is assigned to the location detected in said location detecting step;
   a vibration step of vibrating the touch panel, in a case where said determination step determines that the key is assigned to the location, in a vibration pattern associated with the key, the vibration pattern being different from a vibration pattern associated with another key among the plurality of keys;
   a voice output step of outputting, in a case where said determination step determines that the key is assigned to the location, a voice associated with the key;
   a key press-detecting step of detecting whether or not the key is pressed;
   a key input-accepting step of accepting a key input, in a case where a predetermined condition is satisfied after detecting that the key is pressed; and
   a control step of controlling said vibration step to vibrate said touch panel when a key is touched, and controlling said voice output step to output the voice when the key has been kept touched beyond a predetermined time period, while not outputting the voice when the key is not kept touched beyond the predetermined time period.

10. A non-transitory computer-readable storage medium storing a computer program executable by a computer provided with a touch panel, the computer program comprising:
   a location detecting module for detecting a location on the touch panel touched by a user, a plurality of keys being located on an operating screen corresponding to the touch panel;
   a determination module for determining whether or not a key is assigned to the location detected by said location detecting module;
   a vibration module for vibrating the touch panel, in a case where said determination module determines that the key is assigned to the location, in a vibration pattern associated with the key;
   a voice output module for outputting, in a case where said determination module determines that the key is assigned to the location, a voice associated with the key, the vibration pattern being different from a vibration pattern associated with another key among the plurality of keys;
   a key press-detecting module for detecting whether or not the key is pressed;
   a key input-accepting module for accepting a key input, in a case where a predetermined condition is satisfied after detecting that the key is pressed; and
   a control module for controlling said vibration module to vibrate said touch panel when a key is touched, and controlling said voice output module to output the voice when the key has been kept touched beyond a predetermined time period, while not outputting the voice when the key is not kept touched beyond the predetermined time period.

11. An information input device comprising:

a location detector section that detects a location on a touch panel touched by a user, a plurality of keys being located on an operating screen corresponding to the touch panel;

a determination section that determines whether a key is touched, in accordance with the location detected by said location detector section;

a vibrator section that is operable to vibrate said touch panel in a vibration pattern associated with a key, the vibration pattern being different from a vibration pattern associated with another key among the plurality of keys;

a voice output section that is operable to output a voice associated with a key;

a key input-accepting section that is operable in a case where a predetermined condition is satisfied after a key is touched, to accept a key input; and a controller that controls said vibrator section to vibrate said touch panel when a key is touched, and controls said voice output section to output the voice when the key has been kept touched beyond a predetermined time period, while not outputting the voice when the key is not kept touched beyond the predetermined time period.

12. The information input device as claimed in claim 11, wherein said key input-accepting section accepts the key input, in a case where the touch panel is not touched before the predetermined time period elapses, after the key is touched.

13. The information input device as claimed in claim 11, wherein said key input-accepting section accepts the key input in a case where the user's finger is removed from the touch panel within the area to which the key is assigned.

14. The information input device as claimed in claim 11, wherein said key input-accepting section does not accept the key input in a case where the location detected by said location detector section shifts out of an area to which the key is assigned.

15. The information input device as claimed in claim 11, wherein said key input-accepting section accepts the key input, in a case where the voice is output and the key has been kept touched beyond a predetermined time period, after the key is touched.

16. The information input device as claimed in claim 11, wherein said key input-accepting section accepts the key input, in a case where the key is pressed after the key is touched.

* * * * *